(12) United States Patent
Rao et al.

(10) Patent No.: US 12,366,911 B2
(45) Date of Patent: Jul. 22, 2025

(54) METHODS AND APPARATUS FOR SELECTIVELY EXTRACTING AND LOADING REGISTER STATES

(71) Applicant: Intel Corporation, Santa Clara, CA (US)

(72) Inventors: Shiva Rao, Belmont, CA (US); David Munday, Santa Cruz, CA (US)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 18/449,479

(22) Filed: Aug. 14, 2023

(65) Prior Publication Data

US 2024/0012466 A1    Jan. 11, 2024

Related U.S. Application Data

(60) Continuation of application No. 17/686,174, filed on Mar. 3, 2022, now Pat. No. 11,726,545, which is a
(Continued)

(51) Int. Cl.
*G06F 1/32* (2019.01)
*G01R 31/3177* (2006.01)
(Continued)

(52) U.S. Cl.
CPC ....... *G06F 1/3278* (2013.01); *G01R 31/3177* (2013.01); *G06F 9/30101* (2013.01);
(Continued)

(58) Field of Classification Search
CPC ... G06F 1/3287; G06F 9/30141; G06F 9/3012
See application file for complete search history.

(56) References Cited

U.S. PATENT DOCUMENTS

| 4,099,242 A | | 7/1978 | Houston et al. |
| 5,307,504 A | * | 4/1994 | Robinson ................. G06F 8/52 |
| | | | 703/22 |

(Continued)

OTHER PUBLICATIONS

National Institute of Standards and Technology Glossary, NIST Information Technology Laboratory Computer Security Resource Center, Aug. 2011. (Year: 2011).*

*Primary Examiner* — Joseph D Torres
(74) *Attorney, Agent, or Firm* — Fletcher Yoder, P.C.

(57) ABSTRACT

Integrated circuits may include registers that store register states. Only a subset of the registers may store critical register states. The subset of registers may be specially demarcated, such as using synthesis directions in the hardware description, and may be coupled to dedicated extraction/loading circuitry. The extraction/loading circuitry may be implemented using soft or hard logic or can leverage existing programming or debugging circuitry on a programmable integrated circuit. The extraction/loading mechanism may also be implemented using multiplexers and associated control circuitry, scan chain circuitry, a memory-mapped interface, a tool-instantiated or user-instantiated finite state machine, or external memory interface logic. Accessing critical register states in this way can help improve efficiency with live migration events, debugging, retiming, and other integrated circuit operations.

18 Claims, 15 Drawing Sheets

Related U.S. Application Data division of application No. 16/921,633, filed on Jul. 6, 2020, now Pat. No. 11,287,870, which is a continuation of application No. 16/258,931, filed on Jan. 28, 2019, now Pat. No. 10,725,528, which is a division of application No. 15/197,448, filed on Jun. 29, 2016, now Pat. No. 10,216,254.

(51) Int. Cl.
  *G06F 1/3234* (2019.01)
  *G06F 9/30* (2018.01)
  *G06F 30/3312* (2020.01)

(52) U.S. Cl.
  CPC ........ *G06F 9/3012* (2013.01); *G06F 9/30141* (2013.01); *G06F 30/3312* (2020.01)

(56) References Cited

U.S. PATENT DOCUMENTS

| | | | |
|---|---|---|---|
| 5,432,795 A | 7/1995 | Robinson | |
| 6,242,269 B1 | 6/2001 | Whetsel | |
| 7,155,707 B2 | 12/2006 | Clarke | |
| 8,346,726 B2 | 1/2013 | Liu et al. | |
| 8,621,275 B1 | 12/2013 | Havemose | |
| 8,667,066 B1 | 3/2014 | Havemose | |
| 8,943,248 B2 | 1/2015 | Visalli et al. | |
| 9,043,640 B1 | 5/2015 | Havemose | |
| 9,054,917 B2 | 6/2015 | Khesin | |
| 2003/0135418 A1* | 7/2003 | Shekhar | G06Q 30/06 705/16 |
| 2003/0174332 A1* | 9/2003 | Kwon | G01N 21/538 356/437 |
| 2004/0232997 A1* | 11/2004 | Hein | H03L 1/022 331/16 |
| 2004/0237015 A1* | 11/2004 | Abdel-Hafez | G01R 31/318572 714/726 |
| 2005/0268298 A1* | 12/2005 | Hunt | G06F 9/5077 718/1 |
| 2007/0150780 A1* | 6/2007 | Shimooka | G06F 1/3203 714/726 |
| 2008/0235300 A1* | 9/2008 | Nemoto | G06F 16/119 |
| 2009/0083467 A1* | 3/2009 | Giles | G06F 13/24 710/263 |
| 2009/0094603 A1 | 4/2009 | Hiltgen et al. | |
| 2009/0164660 A1* | 6/2009 | Abrams | G06F 9/4856 709/236 |
| 2010/0250824 A1 | 9/2010 | Belay | |
| 2011/0179415 A1 | 7/2011 | Donnellan et al. | |
| 2011/0219208 A1 | 9/2011 | Asaad et al. | |
| 2012/0166852 A1 | 6/2012 | Sodhi et al. | |
| 2012/0179650 A1 | 7/2012 | Vechev et al. | |
| 2012/0254862 A1 | 10/2012 | Dong | |
| 2013/0054734 A1 | 2/2013 | Bond et al. | |
| 2013/0151848 A1* | 6/2013 | Baumann | H04L 9/3263 713/164 |
| 2013/0346572 A1* | 12/2013 | Jain | G06F 9/5088 709/223 |
| 2015/0256446 A1* | 9/2015 | Doi | H04L 45/14 709/203 |
| 2016/0105378 A1* | 4/2016 | Xia | H04L 49/254 370/381 |
| 2017/0185533 A1* | 6/2017 | Rozas | G06F 12/1408 |

\* cited by examiner

METHODS AND APPARATUS FOR SELECTIVELY EXTRACTING AND LOADING REGISTER STATES

CROSS-REFERENCE TO RELATED APPLICATIONS

This application is a continuation of U.S. patent application Ser. No. 17/686,174, filed Mar. 3, 2022, which is a division of U.S. patent application Ser. No. 16/921,633, filed Jul. 6, 2020, now U.S. Pat. No. 11,287,870, which is a continuation of U.S. patent application Ser. No. 16/258,931, filed Jan. 28, 2019, now U.S. Pat. No. 10,725,528, which is a division of U.S. patent application Ser. No. 15/197,448, filed Jun. 29, 2016, now U.S. Pat. No. 10,216,254, each of which is hereby incorporated by reference herein in its entirety for all purposes.

BACKGROUND

Integrated circuits often contain registers for storing register states. A typical integrated circuit may hold hundreds or thousands of register states during normal operation of the integrated circuit.

During debugging operations (as an example), it would be very time consuming to have to exhaustively monitor all of the register states on the integrated circuit. As another example, during retiming operations, it would be very time consuming to have to check the performance impact of moving every single register on the integrated circuit. As yet another example, it would be very inefficient to have to transfer all register states from one integrated circuit to another during a live migration event (i.e., an event where running of an application is transferred from one computing resource to another).

It is within this context that the embodiments described herein arise.

SUMMARY

An integrated circuit is provided that includes registers. A portion of the registers that store critical register states may be specially demarcated using synthesis directives in a hardware description (as an example), and these critical registers may be coupled to access circuitry that can selectively extract and/or load data into the critical registers.

The access circuitry may be implemented using various embodiments, which are not mutually exclusive to one another. As examples, the access circuitry may be implemented using multiplexing circuits inserted at the inputs and outputs of the critical registers, using scan chain circuitry, leverage existing programming logic on the integrated circuit, using a memory-mapped interface, using existing debugging fabric on the integrated circuit, using a tool-instantiated or user-instantiated finite state machine, and/or using control logic that extracts the critical register states onto an external memory coupled to the integrated circuit.

Configured as such, the access circuitry can help extract and load data during live migration events in which critical register states are extracted from a source server and loaded into a destination server. The critical register states may be stored in a programmable coprocessor that is coupled to a host processor, where the coprocessor is operated as a hardware accelerator to help improve the performance of virtual machines running on the host processor. If desired, the synthesis directives can also help speed up debugging, retiming, and other integrated circuit design procedures.

Further features of the present disclosure, its nature and various advantages will be more apparent from the accompanying drawings and following detailed description.

DETAILED DESCRIPTION

Embodiments of the present disclosure relate to efficient ways for extracting and/or loading critical register states on an integrated circuit. It will be recognized by one skilled in the art, that the present exemplary embodiments may be practiced without some or all of these specific details. In other instances, well-known operations have not been described in detail in order not to unnecessarily obscure the present embodiments.

Integrated circuits such as programmable integrated circuits typically include registers for storing register states. However, only a subset of the register states may be deemed critical for proper functionality and optimal performance of the integrated circuit. This special sub set of registers that store "critical register states" may be uniquely identified using special comments in software (e.g., using synthesis directives in the hardware description language code).

Marked in this way, various critical register state extracting/loading mechanisms (sometimes referred to as register state access circuitry) may be implemented to extract and load critical register states on a programmable integrated circuit. Selectively identifying and accessing critical registers in this way can help improve the efficiency of many integrated circuit applications, including live migration of network functions virtualization (NFV) platforms, debugging, timing analysis, etc.

Figure 1:
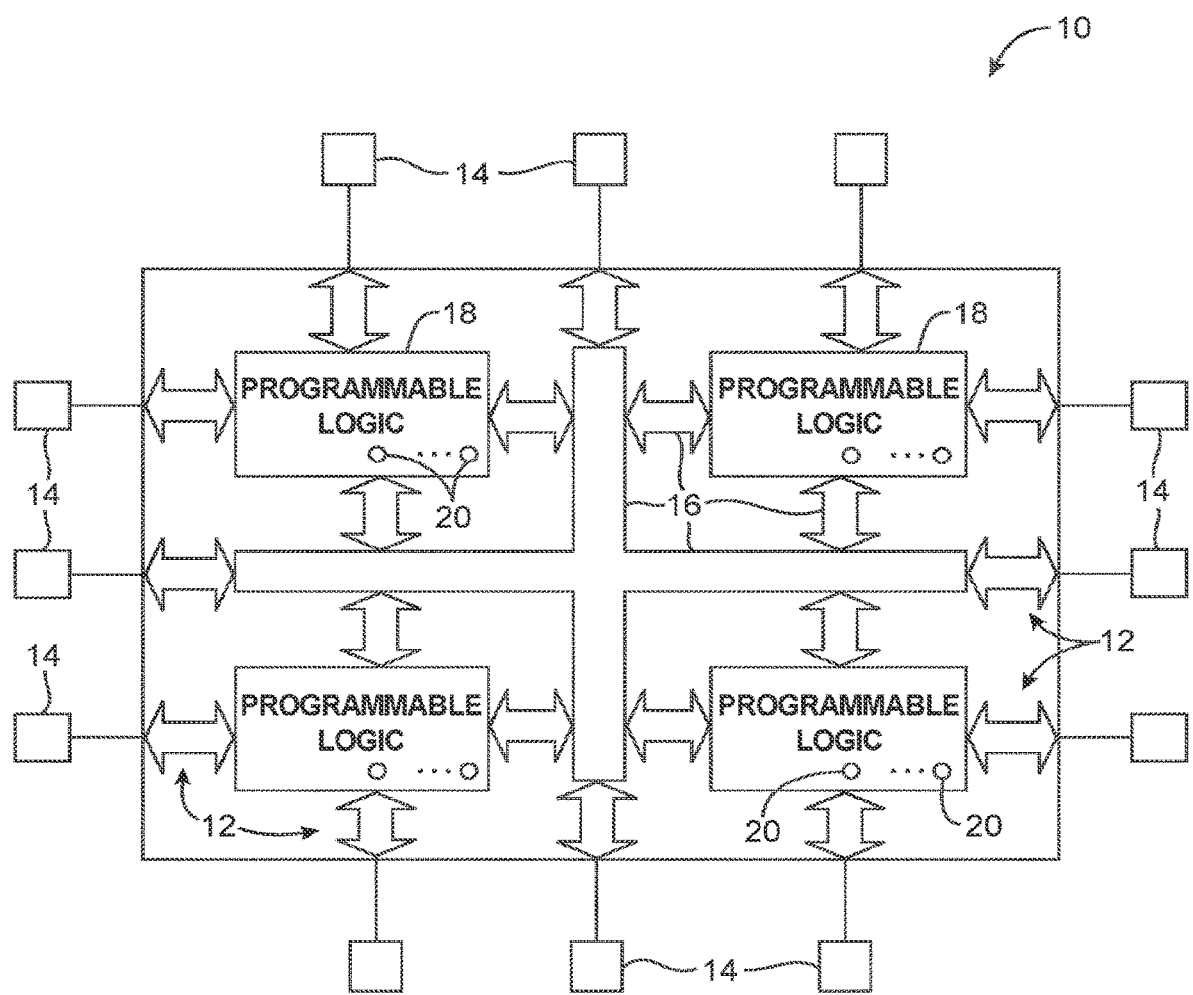
FIG. 1 is a diagram of an illustrative programmable integrated circuit in accordance with an embodiment.

An illustrative embodiment of an integrated circuit such as a programmable logic device (PLD) 10 that may be designed using computer-aided design tools is shown in FIG. 1. Programmable logic device 10 may have input-output (I/O) circuitry 13 for driving signals off of PLD 10 and for receiving signals from other devices. Input-output (I/O) circuitry 13 may include conventional input-output (I/O) circuitry, serial data transceiver circuitry, differential receiver and transmitter circuitry, or other circuitry used to connect one integrated circuit to another integrated circuit.

Programmable logic regions may include programmable components such as digital signal processing circuitry 12, storage circuitry 16, or other combinational and sequential logic circuitry organized in logic array blocks (LAB s) 11. The programmable logic regions may be configured to perform a custom logic function. If desired, the programmable logic region may include digital signal processing circuitry 12 and storage circuitry 16 which both may be organized in specialized processing blocks that have limited configurability. The programmable logic region may include additional specialized processing blocks such as programmable phase-locked loop circuitry, programmable delay-locked loop circuitry, or other specialized processing blocks with limited configurability.

The circuitry of programmable logic device 10 may be organized using any suitable architecture. As an example, the logic of programmable logic device 10 may be organized in a series of rows and columns of larger programmable logic regions each of which contains multiple smaller logic regions. The smaller regions may be, for example, regions of logic that are sometimes referred to as logic elements (LEs) or basic logic elements (BLEs), each containing a look-up table, one or more registers, and programmable multiplexer circuitry. The smaller regions may also be, for example, regions of logic that are sometimes referred to as adaptive logic modules (ALMs), configurable logic blocks (CLBs), slice, half-slice, etc. Each adaptive logic module may include a pair of adders, a pair of associated registers and a look-up table or other block of shared combinational logic (i.e., resources from a pair of LEs—sometimes referred to as adaptive logic elements or ALEs in this context). The larger regions may be, for example, logic array blocks (LABs) or logic clusters of regions of logic containing multiple logic elements or multiple ALMs. The LABs 11 may also be referred to as "logic sectors," or "sectors of logic fabric." Generally, regions in PLD 10 that contain multiple LABs may be referred to as the "logic fabric" of the PLD 10.

Vertical interconnection resources 14 and horizontal interconnection resources such as global and local vertical and horizontal conductive lines and buses may be used to route signals on PLD 10. Vertical and horizontal interconnection resources 14 and 15 include conductive lines and programmable connections between respective conductive lines and are therefore sometimes referred to as programmable interconnects.

Figure 2:
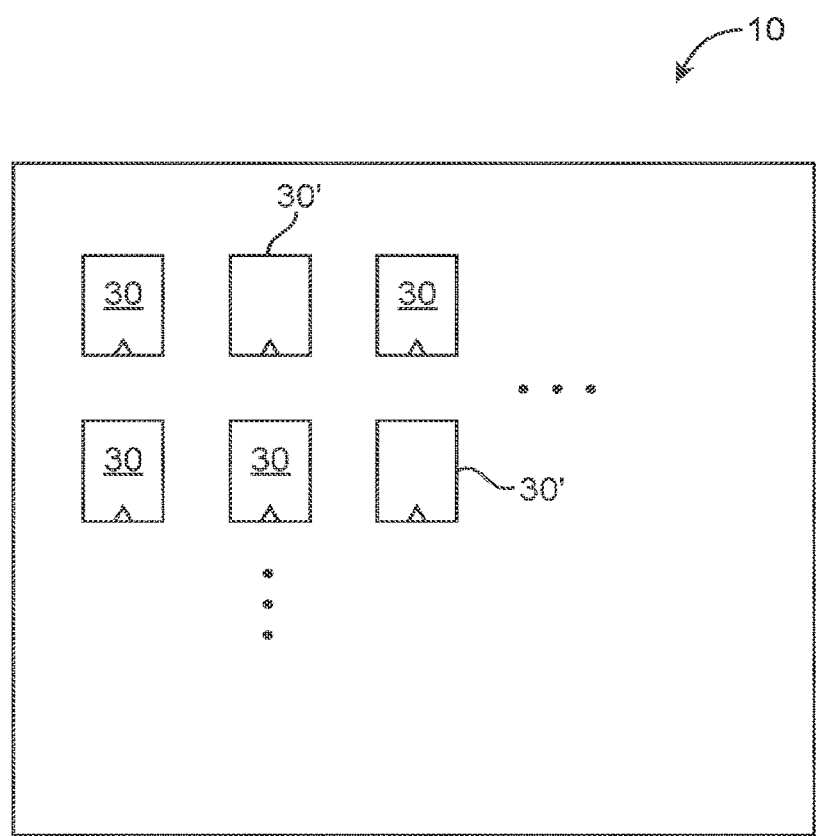
FIG. 2 is a diagram of an illustrative integrated circuit having registers that store register states in accordance with an embodiment.

FIG. 2 is a diagram showing how device 10 may include storage circuits such as registers 30. Registers 30 may be clock-triggered latches for storing data. The data that is held by registers 30 are sometimes referred to as register states. A portion of the registers may store critical states and can be referred to as critical registers 30'. Registers 30' store critical register states. The critical register states may be more important than non-critical register states. Thus, it may be more efficient to selectively access only the critical register states instead of all register states on device 10.

Computer-aided design (CAD) tools in a circuit design system may be used to identify which register 30 holds the critical register states. In response to identifying the critical registers, the CAD tools may connect the critical registers to dedicated circuitry for extracting the critical states or to load critical states into the registers.

Figure 3:
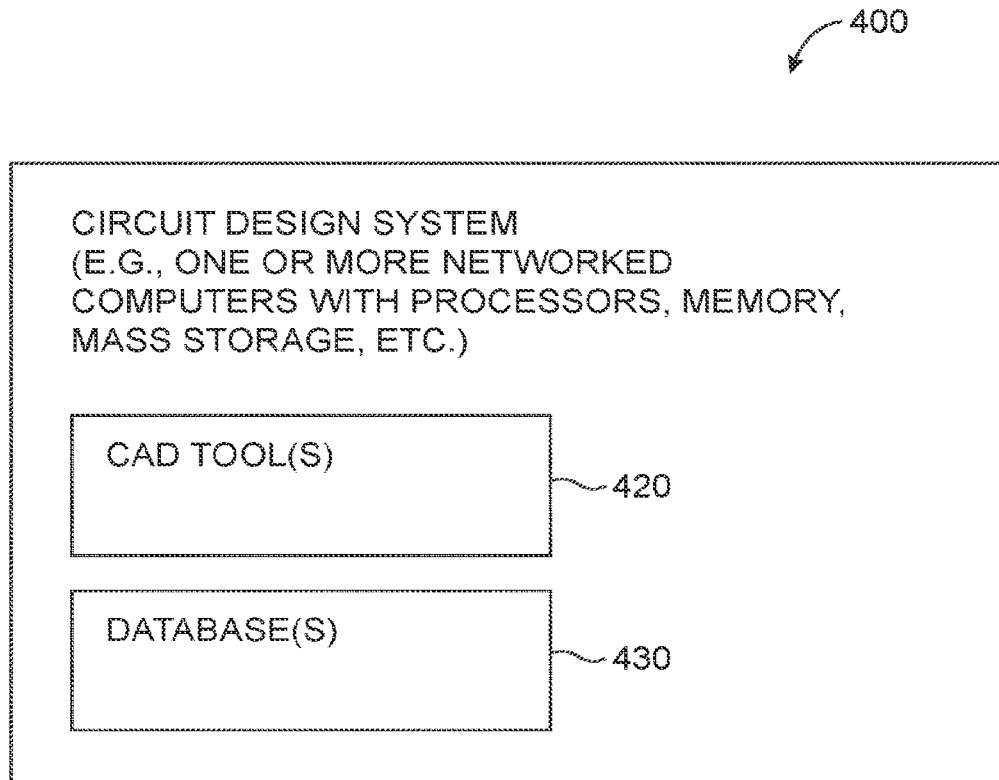
FIG. 3 is a diagram of a circuit design system that may be used to design integrated circuits in accordance with an embodiment.

An illustrative circuit design system 400 in accordance with an embodiment is shown in FIG. 3. Circuit design system 400 may be implemented on integrated circuit design computing equipment. For example, system 400 may be based on one or more processors such as personal computers, workstations, etc. The processor(s) may be linked using a network (e.g., a local or wide area network). Memory in these computers or external memory and storage devices such as internal and/or external hard disks may be used to store instructions and data.

Software-based components such as computer-aided design tools 420 and databases 430 reside on system 400. During operation, executable software such as the software of computer aided design tools 420 runs on the processor(s) of system 400. Databases 430 are used to store data for the operation of system 400. In general, software and data may be stored on any computer-readable medium (storage) in system 400. Such storage may include computer memory chips, removable and fixed media such as hard disk drives, flash memory, compact discs (CDs), digital versatile discs (DVDs), Blu-ray discs (BDs), other optical media, and floppy diskettes, tapes, or any other suitable memory or storage device(s). When the software of system 400 is installed, the storage of system 400 has instructions and data that cause the computing equipment in system 400 to execute various processes. When performing these processes, the computing equipment is configured to implement the functions of the circuit design system.

The computer aided design (CAD) tools 420, some or all of which are sometimes referred to collectively as a CAD tool, a circuit design tool, or an electronic design automation (EDA) tool, may be provided by a single vendor or by multiple vendors. Tools 420 may be provided as one or more suites of tools (e.g., a compiler suite for performing tasks associated with implementing a circuit design in a programmable logic device) and/or as one or more separate software components (tools). Database(s) 430 may include one or more databases that are accessed only by a particular tool or tools and may include one or more shared databases. Shared databases may be accessed by multiple tools. For example, a first tool may store data for a second tool in a shared database. The second tool may access the shared database to retrieve the data stored by the first tool. This allows one tool to pass information to another tool. Tools may also pass information between each other without storing information in a shared database if desired.

Figure 4:
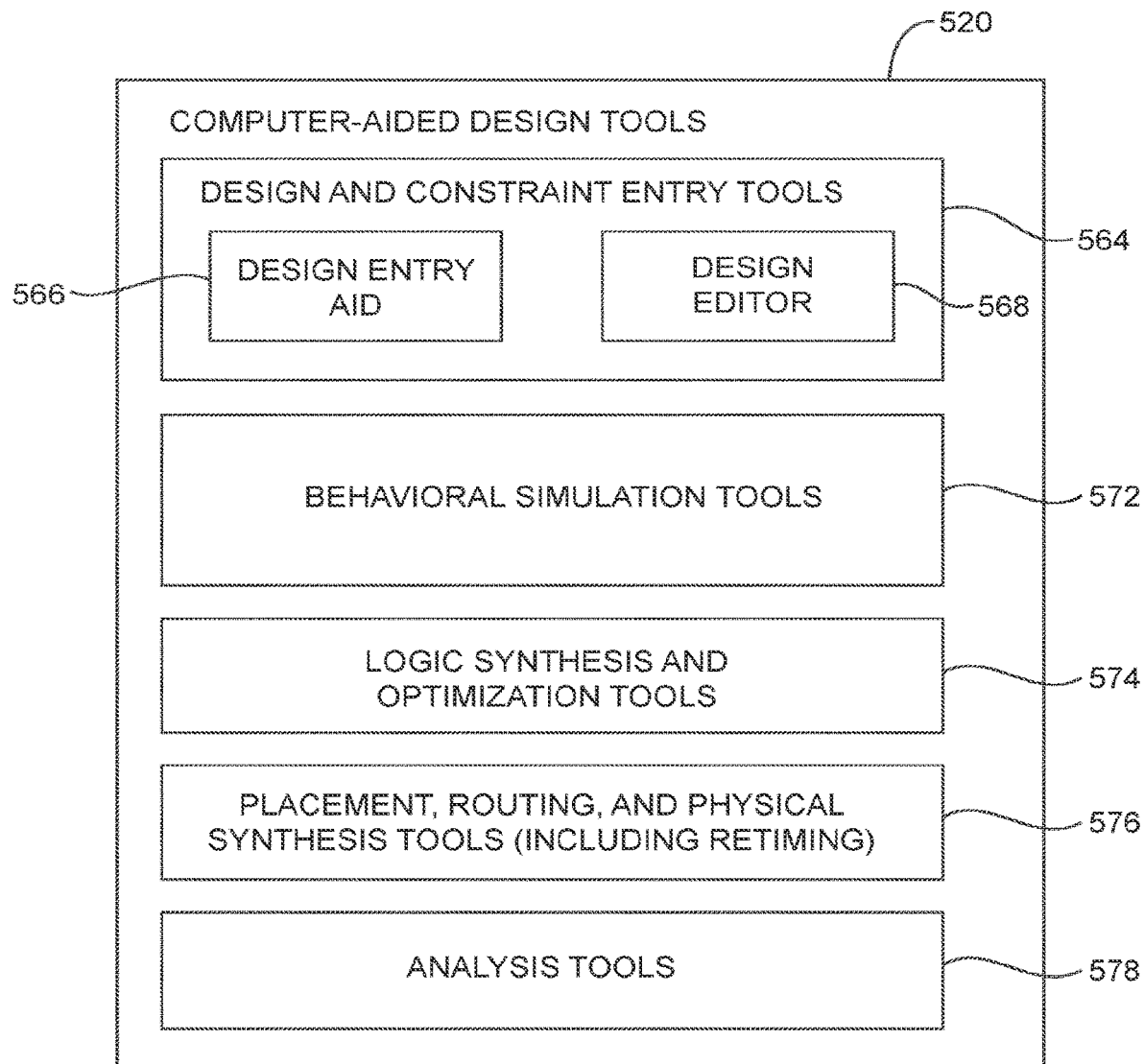
FIG. 4 is a diagram of illustrative computer-aided design (CAD) tools that may be used in a circuit design system in accordance with an embodiment.

Illustrative computer aided design tools 520 that may be used in a circuit design system such as circuit design system 400 of FIG. 3 are shown in FIG. 4. The design process may start with the formulation of functional specifications of the integrated circuit design (e.g., a functional or behavioral description of the integrated circuit design). A circuit designer may specify the functional operation of a desired circuit design using design and constraint entry tools 564. Design and constraint entry tools 564 may include tools such as design and constraint entry aid 566 and design editor 568. Design and constraint entry aids such as aid 566 may be used to help a circuit designer locate a desired design from a library of existing circuit designs and may provide computer-aided assistance to the circuit designer for entering (specifying) the desired circuit design.

As an example, design and constraint entry aid 566 may be used to present screens of options for a user. The user may click on on-screen options to select whether the circuit being designed should have certain features. Design editor 568 may be used to enter a design (e.g., by entering lines of hardware description language code), may be used to edit a design obtained from a library (e.g., using a design and constraint entry aid), or may assist a user in selecting and editing appropriate prepackaged code/designs.

Design and constraint entry tools 564 may be used to allow a circuit designer to provide a desired circuit design using any suitable format. For example, design and constraint entry tools 564 may include tools that allow the circuit designer to enter a circuit design using truth tables. Truth tables may be specified using text files or timing diagrams and may be imported from a library. Truth table circuit design and constraint entry may be used for a portion of a large circuit or for an entire circuit.

As another example, design and constraint entry tools 564 may include a schematic capture tool. A schematic capture tool may allow the circuit designer to visually construct integrated circuit designs from constituent parts such as logic gates and groups of logic gates. Libraries of preexisting integrated circuit designs may be used to allow a desired portion of a design to be imported with the schematic capture tools.

If desired, design and constraint entry tools 564 may allow the circuit designer to provide a circuit design description to the circuit design system 400 using a hardware description language such as Verilog hardware description language (Verilog HDL), Very High Speed Integrated Circuit Hardware Description Language (VHDL), SystemVerilog, or a higher-level circuit description language such as OpenCL or SystemC, just to name a few. The designer of the integrated circuit design can enter the circuit design by writing hardware description language code with editor 568. Blocks of code may be imported from user-maintained or commercial libraries if desired.

After the design has been entered using design and constraint entry tools 564, behavioral simulation tools 572 may be used to simulate the functional performance of the circuit design. If the functional performance of the design is incomplete or incorrect, the circuit designer can make changes to the circuit design using design and constraint entry tools 564. The functional operation of the new circuit design may be verified using behavioral simulation tools 572 before synthesis operations have been performed using tools 574. Simulation tools such as behavioral simulation tools 572 may also be used at other stages in the design flow if desired (e.g., after logic synthesis). The output of the behavioral simulation tools 572 may be provided to the circuit designer in any suitable format (e.g., truth tables, timing diagrams, etc.).

Once the functional operation of the circuit design has been determined to be satisfactory, logic synthesis and optimization tools 574 may generate a gate-level netlist of the circuit design, for example using gates from a particular library pertaining to a targeted process supported by a foundry, which has been selected to produce the integrated circuit. Alternatively, logic synthesis and optimization tools 574 may generate a gate-level netlist of the circuit design using gates of a targeted programmable logic device (i.e., in the logic and interconnect resources of a particular programmable logic device product or product family).

Logic synthesis and optimization tools 574 may optimize the design by making appropriate selections of hardware to implement different logic functions in the circuit design based on the circuit design data and constraint data entered by the logic designer using tools 564. As an example, logic synthesis and optimization tools 574 may perform register retiming on the circuit design based on the length of a combinational path between registers in the circuit design and corresponding timing constraints that were entered by the logic designer using tools 564.

After logic synthesis and optimization using tools 574, the circuit design system may use tools such as placement, routing, and physical synthesis tools 576 to perform physical design steps (layout synthesis operations). Tools 576 can be used to determine where to place each gate of the gate-level netlist produced by tools 574. For example, if two counters interact with each other, tools 576 may locate these counters in adjacent regions to reduce interconnect delays or to satisfy timing requirements specifying the maximum permitted interconnect delay. Tools 576 create orderly and efficient implementations of circuit designs for any targeted integrated circuit (e.g., for a given programmable integrated circuit such as a field-programmable gate array (FPGA)).

Tools such as tools 574 and 576 may be part of a compiler suite (e.g., part of a suite of compiler tools provided by a programmable logic device vendor). In certain embodiments, tools such as tools 574, 576, and 578 may also include timing analysis tools such as timing estimators. This allows tools 574 and 576 to satisfy performance requirements (e.g., timing requirements) before actually producing the integrated circuit.

As an example, tools 574 and 576 may perform register retiming by moving registers through combinational logic (e.g., through logic AND, OR, XOR, and other suitable gates, look-up tables (LUTs), multiplexers, arithmetic operators, etc.). Tools 574 and 576 may push registers forward or backward across combinational logic as illustrated in FIG. 2. Physical synthesis tools 576 used in this way can therefore also be used to perform register retiming.

After an implementation of the desired circuit design has been generated using tools 576, the implementation of the design may be analyzed and tested using analysis tools 578. For example, analysis tools 578 may include timing analysis tools, power analysis tools, or formal verification tools, just to name few.

After satisfactory optimization operations have been completed using tools 520 and depending on the targeted integrated circuit technology, tools 520 may produce a mask-level layout description of the integrated circuit or configuration data for programming the programmable logic device.

Figure 5:
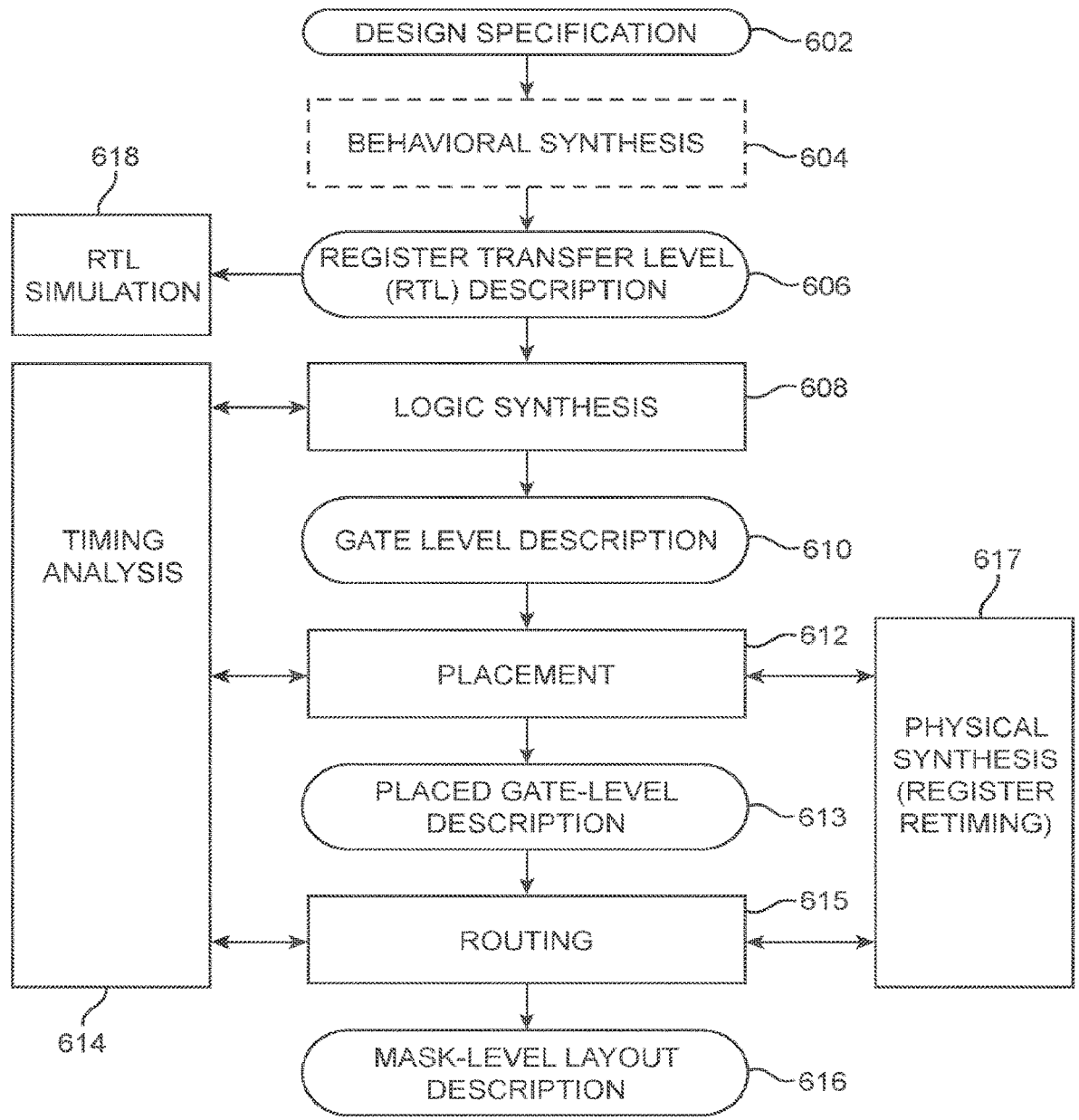
FIG. 5 is a flow chart of illustrative steps for designing an integrated circuit in accordance with an embodiment.

Illustrative Operations Involved in Using Tools 520 of FIG. 4 to produce the mask-level layout description of the integrated circuit are shown in FIG. 5. As shown in FIG. 5, a circuit designer may first provide a design specification 602. The design specification 602 may, in general, be a behavioral description provided in the form of an application code (e.g., C code, C++ code, SystemC code, OpenCL code, etc.). In some scenarios, the design specification may be provided in the form of a register transfer level (RTL) description 606.

The RTL description may have any form of describing circuit functions at the register transfer level. For example, RTL description 606 may be provided using a hardware description language such as the Verilog hardware description language (Verilog HDL or Verilog), the SystemVerilog hardware description language (SystemVerilog HDL or SystemVerilog), or the Very High Speed Integrated Circuit Hardware Description Language (VHDL). If desired, a portion or all of the RTL description may be provided as a schematic representation.

In general, the behavioral design specification 602 may include untimed or partially timed functional code (i.e., the application code does not describe cycle-by-cycle hardware behavior), whereas the RTL description 606 may include a fully timed design description that details the cycle-by-cycle behavior of the circuit at the register transfer level.

Design specification 602 or RTL description 606 may also include target criteria such as area use, power consumption, delay minimization, clock frequency optimization, or any combination thereof. The optimization constraints and target criteria may be collectively referred to as constraints.

Those constraints can be provided for individual data paths, portions of individual data paths, portions of a design, or for the entire design. For example, the constraints may be provided with the design specification 602, the RTL description 606 (e.g., as a pragma or as an assertion), in a constraint file, or through user input (e.g., using the design and constraint entry tools 564 of FIG. 4), to name a few.

At step 604, behavioral synthesis (sometimes also referred to as algorithmic synthesis) may be performed to convert the behavioral description into an RTL description 606. Step 604 may be skipped if the design specification is already provided in form of an RTL description.

At step 618, behavioral simulation tools 572 may perform an RTL simulation of the RTL description, which may verify the functional performance of the RTL description. If the functional performance of the RTL description is incomplete or incorrect, the circuit designer can make changes to the HDL code (as an example). During RTL simulation 618, actual results obtained from simulating the behavior of the RTL description may be compared with expected results.

During step 608, logic synthesis operations may generate gate-level description 610 using logic synthesis and optimization tools 574 from FIG. 4. If desired, logic synthesis operations may perform register retiming according to the constraints that are included in design specification 602 or RTL description 606. The output of logic synthesis 608 is gate-level description 610.

During step 612, placement operations using for example placement tools 576 of FIG. 4 may place the different gates in gate-level description 610 in a preferred location on the targeted integrated circuit to meet given target criteria (e.g., minimize area and maximize routing efficiency or minimize path delay and maximize clock frequency or any combination thereof). The output of placement 612 is placed gate-level description 613.

During step 615, routing operations using for example routing tools 576 of FIG. 4 may connect the gates from the placed gate-level description 613. Routing operations may attempt to meet given target criteria (e.g., minimize congestion, minimize path delay and maximize clock frequency or any combination thereof). The output of routing 615 is a mask-level layout description 616 (sometimes referred to as routed gate-level description 616).

While placement and routing is being performed at steps 612 and 615, physical synthesis operations 617 may be concurrently performed to further modify and optimize the circuit design (e.g., using physical synthesis tools 576 of FIG. 4). If desired, register retiming operations may be performed during physical synthesis step 617. For example, registers in the placed gate-level description 613 or the routed gate-level description 616 may be moved around according to the constraints that are included in design specification 602 or RTL description 606.

In accordance with an embodiment of the present disclosure, circuit design system 400 can sometimes be used to mark a selected group of one or more registers as "critical." For example, a register may be denoted as being a critical register using exemplary synthesis directives around one or more register declaration as follows in either design specification 602 or RTL description 606:

reg [8:0] out1
// synthesis start_critical_state
reg [7:0] out2
reg [6:0] out3
// synthesis end_critical_state
reg [7:0] out4
. . . .

In the code above, a first 9-bit register having an output out1, a second 8-bit register having an output out2, a third 7-bit register having an output out3, and a fourth 8-bit register having an output out4 have been specified. The synthesis directives (comments) "// synthesis start_critical_state" and "// synthesis end_critical_state" may be used mark which registers hold the critical register states. In the example above, the second and third registers having outputs out2 and out3 (surrounded by the special synthesis directives) are denoted as critical, whereas the first and fourth registers having outputs out1 and out4 (sitting outside the start and end synthesis directives) are marked as non-critical.

The synthesis tools (e.g., behavioral synthesis tools 572 or logic synthesis tools 574 of FIG. 4) will recognize these synthesis directives and will connect only the critical registers to specialized logic for state extraction and loading. Accessing only the critical registers instead of having to iterate through every single register state on the integrated circuit can help simplify routing complexity while also reducing processing time. Using synthesis directives to demarcate critical registers in the hardware description code is merely illustrative and does not serve to limit the scope of the present embodiments. If desired, other suitable ways of uniquely identifying the location of the critical register states may be employed.

One application in which selective extraction/loading of critical register states may be helpful is in the context of a network functions virtualization (NFV) platform and, in particular, in the migration of critical register states from one NFV server to another.

Conventionally, complex networks are built using fragmented, non-commodity hardware. When expanding or upgrading the network, new application-specific hardware needs to be installed, which not only increases deployment costs for existing vendors but also presents a large barrier to entry for new vendors, limiting innovation and competition.

In an effort to accelerate the deployment of new network services to satisfy the ever increasing consumer demand for improved network speed and reliability, vendors (e.g., telecommunications operators or service providers such AT&T, Verizon, British Telecom, etc.) have come together and created the European Telecommunications Standards Institute (ETSI) Industry Specification Group (ISG). The ETSI ISG has since introduced virtualization technologies that can be applied to networking technologies to create a more intelligent and more agile service infrastructure. This concept of running network functions such as those performed traditionally by application-specific routers, firewalls, load balancers, content delivery networks (CDN), broadband network gateways (BNG), network address translators (NAT), domain name systems (DNS), and other networking devices in software on commodity hardware is sometimes referred to as Network Functions Virtualization (NFV).

To further enhance the achievable speed of the virtualized networks, a commodity CPU may be coupled to a hardware accelerator or a "coprocessor." In accordance with an embodiment, the hardware accelerator may be a programmable integrated circuit such as programmable logic device 10 of the type described in connection with FIG. 1.

Figure 6:
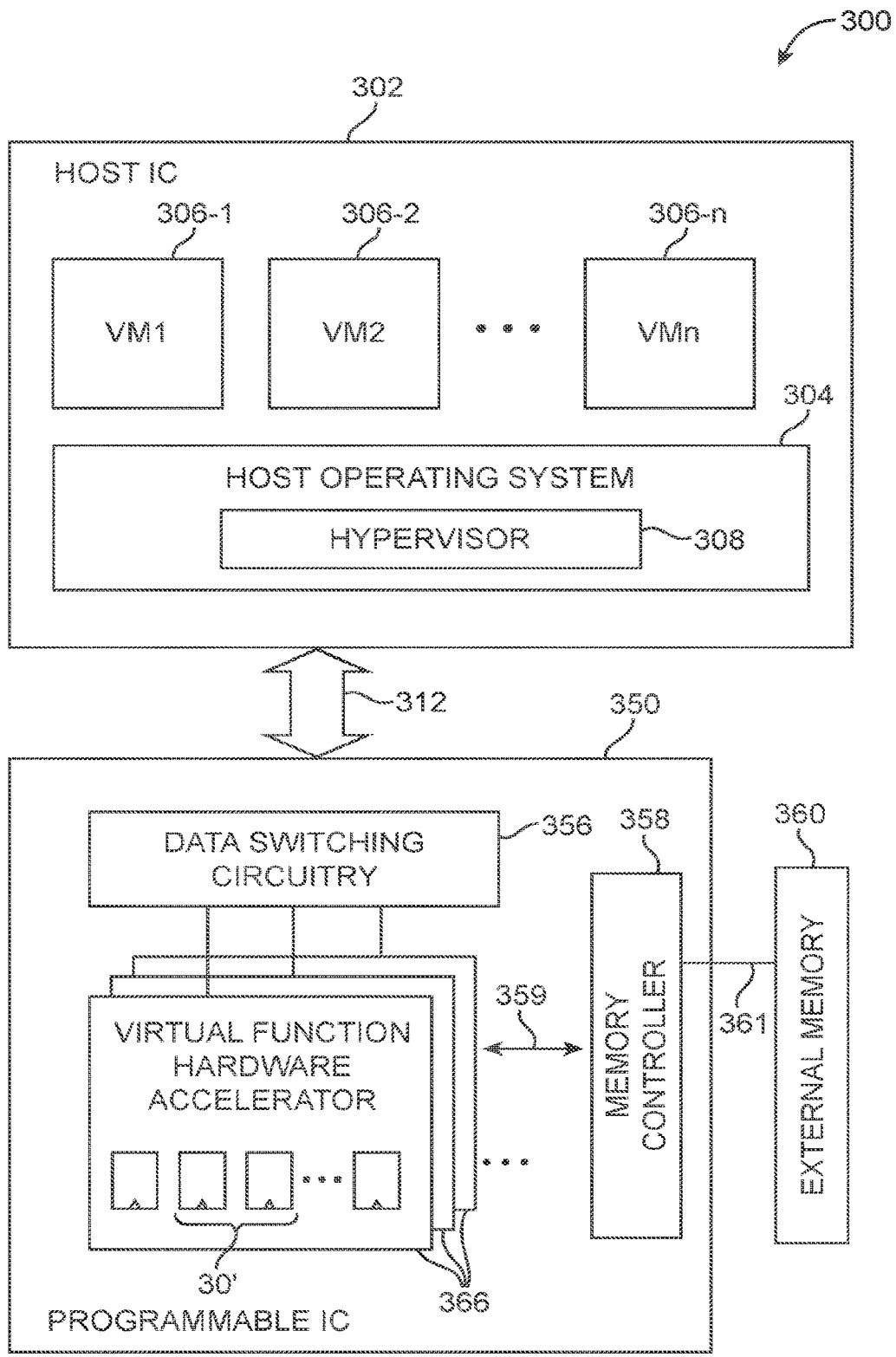
FIG. 6 is a diagram of an illustrative network functions virtualization (NFV) platform that includes a host processing unit coupled to a programmable hardware accelerator in accordance with an embodiment.

FIG. 6 is a diagram of an illustrative NFV platform 300 where a host integrated circuit (sometimes referred to as a central processing unit or CPU) 302 is coupled to a hardware accelerator coprocessor such as a programmable integrated circuit 350. As shown in FIG. 6, a host operating system (host OS) 304 may be loaded on device 302, and software/firmware running on host IC 302 may include at least a hypervisor such as hypervisor 308 that is sometimes considered to be part of host OS 304 and N associated virtual machines 306 (e.g., virtual machines 306-1, 306-2, . . . , 306-n).

Hypervisor 308 may serve as a virtual machine monitor (VMM) that runs one or more virtual machines 306 on server 300. Each virtual machine 306 may be referred to as a "guest machine" and may each run a guest operating system (OS). Hypervisor 308 presents the guest operating systems with a virtual operating platform and manages the execution of the guest operating systems while sharing virtualized hardware resources. Hypervisor 308 may run directly on the host's hardware (as a type-1 bare metal hypervisor) or may run on top of an existing host operating system (as a type-2 hosted hypervisor). If desired, additional paravirtualization drivers and tools (not shown) may be used to help each guest virtual machine communicate more efficiently with the underlying physical hardware.

Host IC 302 may communicate with coprocessor 350 via interface 312. Interface 312 may, as an example, be a Peripheral Component Interconnect Express (PCIe) interface. The use of a PCIe bus to connect CPU 302 and coprocessor 350 is merely illustrative. If desired, other types of input-output interface technologies can be used, including the Industry Standard Architecture (ISA) bus standard, the Micro Channel Architecture (MCA) bus standard, the Video Electronics Standards Association Local Bus (VESA) bus standard, the legacy PCI bus standard, the Accelerated Graphics Port (AGP) bus standard, the Universal Serial Bus (USB) standard, the Universal Asynchronous Receiver/Transmitter (UART) bus standard, etc.

Still referring to FIG. 6, coprocessor 350 may also include at least a memory controller 358 (e.g., a memory controller for interfacing with external memory 360 that is directly coupled to coprocessor 350), data switching circuitry 356, and one or more virtual function hardware accelerators 366. Each accelerator 366 may serve to provide hardware acceleration for one or more of the virtual machines 306 running on host processor 302. Data switching circuitry 356 may be configured to route data among the accelerators 366 and to interface with host processor 302. Accelerators 366 may also be able to communicate directly with memory controller 358 via path 359.

In accordance with an embodiment, each virtual function hardware accelerator 366 may have associated registers storing register states. In most scenarios, only a subset of these registers hold critical states. During live migration events in which operation at a source server is being migrated to a destination server, it may be desirable to provide an efficient way of transferring over register states of hardware accelerators 366 without having to migrate over all existing register states within coprocessor 350. Thus, only critical register states associated with specially demarcated registers 30' may be migrated during a live migration event.

Figure 7:
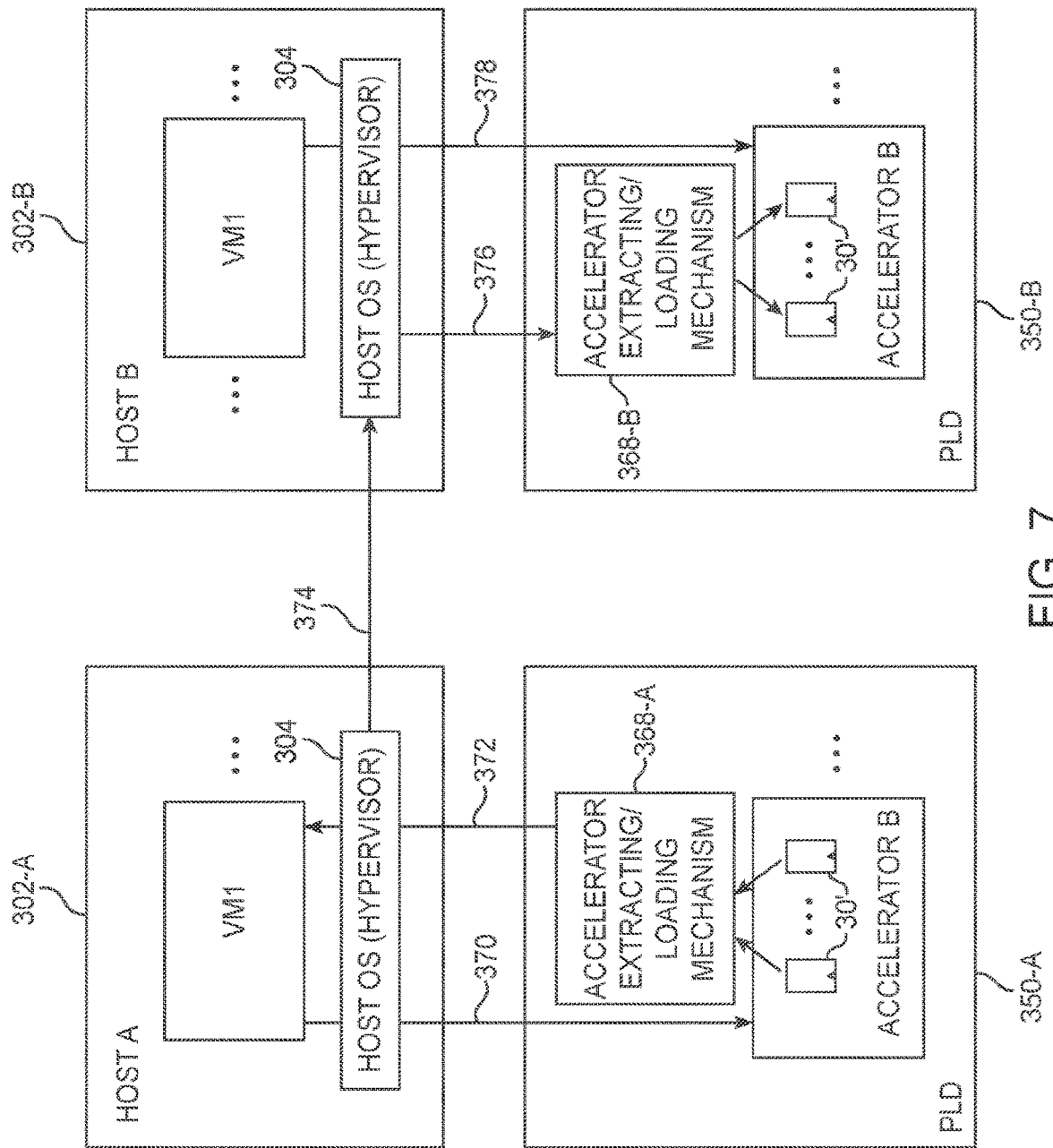
FIG. 7 is a diagram illustrating circuitry involved in extracting and migrating critical register states from one NFV server to another NFV server in accordance with an embodiment.

FIG. 7 is a diagram illustrating circuitry involved in extracting and migrating critical register states from one NFV server to another NFV server in accordance with an embodiment. As shown in FIG. 7, applications running on a first (source) server that includes host processor 302-A and coprocessor 350-A may be migrated to a second (destination) server that includes host processor 302-B and coprocessor 350-B. In the example of FIG. 7, only one instance of virtual machines 306 (e.g., virtual machine VM1) and hardware accelerators 366 (e.g., accelerator B) are shown in both source and destination servers in order to not unnecessarily obscure the present embodiments. However, it is understood that host processors 302-A and 302-B may host other virtual machines 306 while coprocessors 350-A and 350-B include additional corresponding instances of virtual function hardware accelerators 366 (see, e.g., FIG. 6).

In particular, coprocessor 350-A may include accelerator extracting/loading mechanism 368-A that can be used to extract critical register states from registers 30' associated with accelerator B within coprocessor 350-A. Mechanism 368-A may only be coupled to the critical registers 30' that have been specially marked using critical register state synthesis directives. Similarly, coprocessor 350-B may include accelerator extracting/loading mechanism 368-B that can be used to load the migrated critical register states into registers 30' associated with accelerator B within coprocessor 350-B. Mechanism 368-B may only be coupled to the critical registers 30' that have been specially marked by the synthesis directives. Configured in this way, circuitries 368-A and 368-B are connected to critical registers 30' associated with the virtual function hardware accelerators to facilitate extraction of critical register states in the source NFV server and loading of the extracted critical register states in the destination NFV server.

Figure 8:
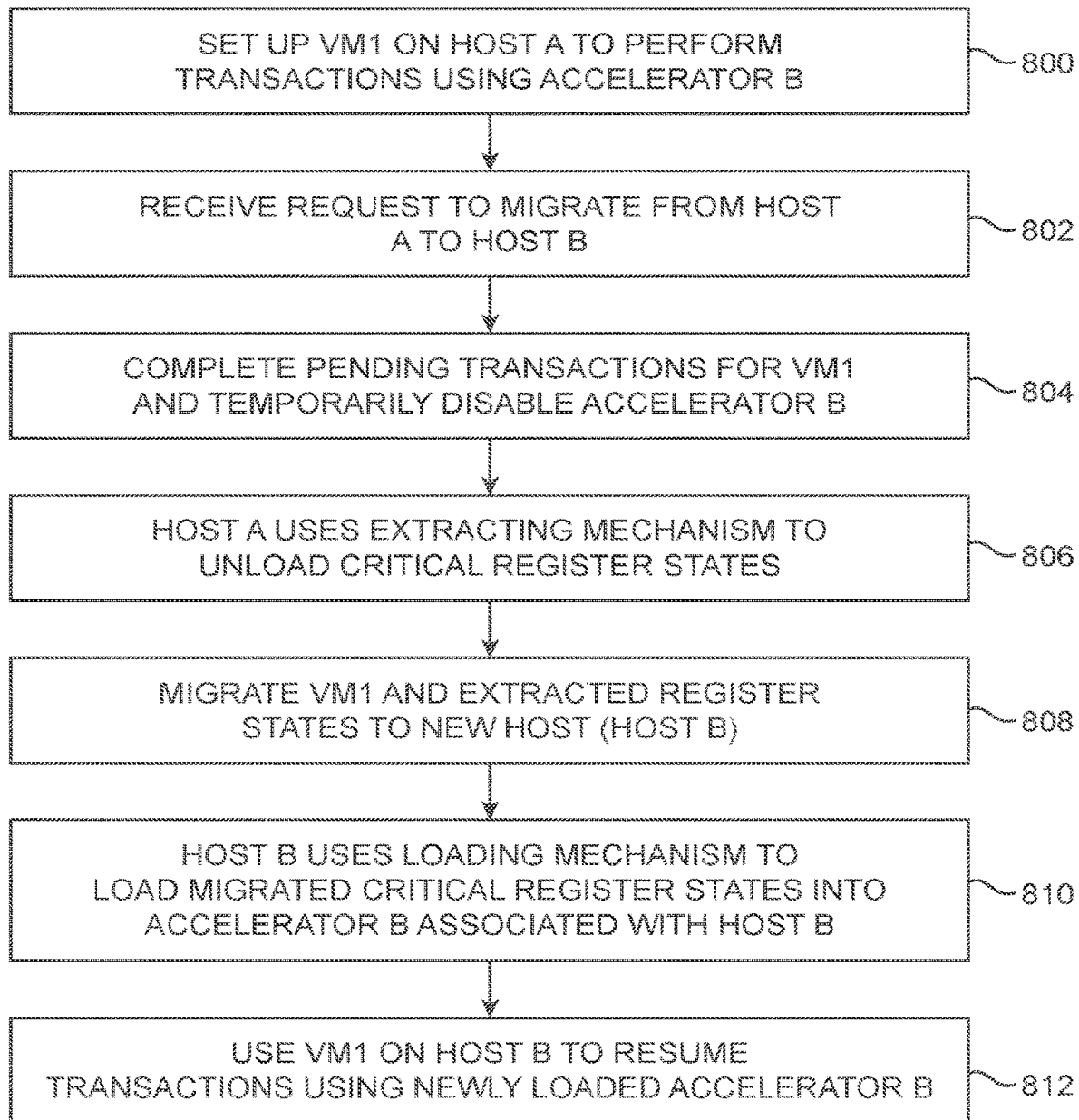
FIG. 8 is a flow chart of illustrative steps involved in migrating critical register states from one NFV server to another in accordance with an embodiment.

FIG. 8 is a flow chart of illustrative steps involved in migrating critical register states from one NFV server to another in accordance with an embodiment. At step 800, host OS 304 may set up virtual machine VM1 on host processor 302-A to perform transactions using accelerator B on coprocessor 350-A. At step 802, host IC 302-A may receive a request to migrate transactions from host processor 302-A to host processor 302-B. At step 804, host processor 302-A may complete all pending transactions for virtual machine VM1 and then temporarily disable accelerator B on coprocessor 350-A (e.g., by sending commands from host processor 302-A to coprocessor 350-A via path 370). This is merely illustrative. If desired, migration can occur without having to disable any hardware accelerators.

At step 806, host processor 302-A may utilize extraction mechanism 368-A to unload critical register states from registers 30' within accelerator B. At step 808, operations associated with virtual machine VM1 and the extracted critical register states may be migrated from the source NFV server to the destination NFV server. For example, critical register states may be conveyed from extraction mechanism 368-A to host processor 302-A via path 372 and may then be migrated to the new host processor 302-B via path 374.

At step 810, host processor 302-B may pass the newly received critical register states to loading mechanism 368-B via path 376. Loading mechanism may then write the critical register states into corresponding critical registers 30' within accelerator B of coprocessor 350-B. At step 812, host OS 304 on processor 302-B may set up virtual machine VM1 on host processor 302-B to resume transactions using accelerator B on coprocessor 350-B (e.g., by sending control and data signals from host processor 302-B to coprocessor 350-B via path 378). After live migration is complete, network operations may continue to be processed at the destination server.

These steps are merely illustrative. The existing steps of FIG. 8 may be modified or omitted; some of the steps may be performed in parallel; additional steps may be added; and the order of certain steps may be reversed or altered.

As described above, an integrated circuit may include an extraction/loading mechanism for accessing critical register states. The critical register states may be stored in specially identified registers that have been marked by the designer during synthesis operations. There are various different ways of implementing the extraction/loading mechanism to efficiently access the critical registers on a programmable integrated circuit.

Figure 9:
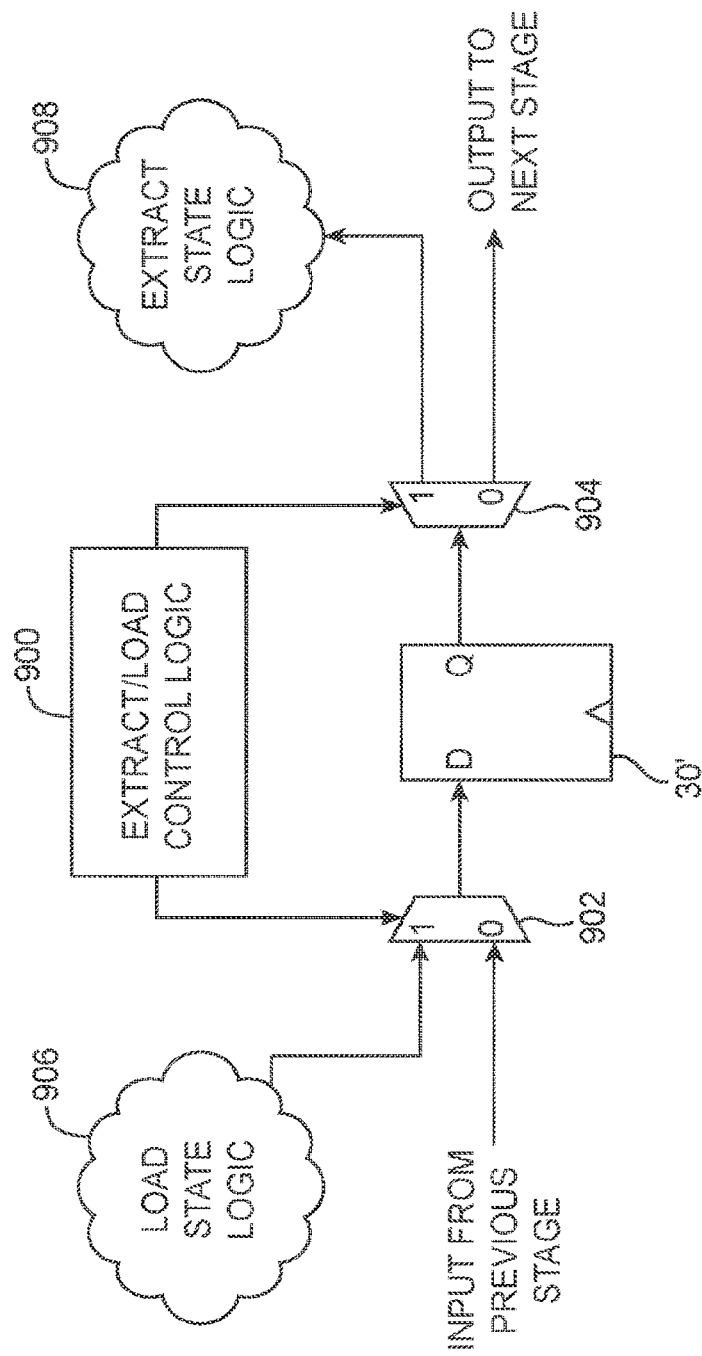
FIG. 9 is a diagram showing additional loading and extracting logic that can be placed around critical registers in accordance with an embodiment.

In accordance with one suitable arrangement, FIG. 9 shows additional loading and extracting logic that can be placed around the critical registers. As shown in FIG. 9, critical register 30' may, for example, be a digital flip-flop having a data input (D) terminal, a data output (Q) terminal, and a clock control terminal. A first multiplexing circuit such as multiplexer 902 may be inserted at the data input terminal of register 30', whereas a second multiplexing circuit such as de-multiplexer 904 may be inserted at the data output terminal of register 30'.

Multiplexer 902 may have a first (0) input terminal that receives input signals from a previous register stage, a second (1) input terminal that receives register states from state loading logic 906, a control terminal, and an output that is connected to input D of register 30'. De-multiplexer 904 may have an input terminal that is connected to output Q of register 30', a first (0) output terminal that feeds output signals to a succeeding register stage, a second (1) output terminal is feeds signals to state extraction logic 908, and a control terminal. The control terminals of both multiplexing circuits 902 and 904 may receive control signals from extract/load control logic 900.

Configured in this way, control logic 900, multiplexing circuits 902 and 904, state loading logic 906, and state extracting logic 908 may serve collectively as the critical register state extraction/loading circuitry. To extract critical register states, control logic 900 may configure de-multiplexer 904 to output signals to state extraction logic 908 (e.g., by applying a logic "1" control bit to the control terminal of de-multiplexer 904). To load a new critical register state into register 30', control logic 900 may configured multiplexer 902 to pass through signals supplied by state loading logic 906 (e.g., by applying a logic "1" control bit to the control terminal of multiplexer 902). In general, logic circuits 900, 906, and 908 may be implemented using "soft" logic (i.e., re-configurable logic circuitry) or "hard" logic (i.e., non-reconfigurable logic circuitry) on the programmable integrated circuit.

The example of FIG. 9 in which logic circuits 900, 906, and 908 are formed around a single critical register 30' to facilitate state extraction/loading is merely illustrative. If desired, all registers 30' storing critical register states (e.g., registers that have been uniquely marked using synthesis directives) may be provided with logic circuits 900, 906, and 908 and associated multiplexing circuits 902 and 904 to help extract and load critical register states in an efficient manner.

Figure 10:
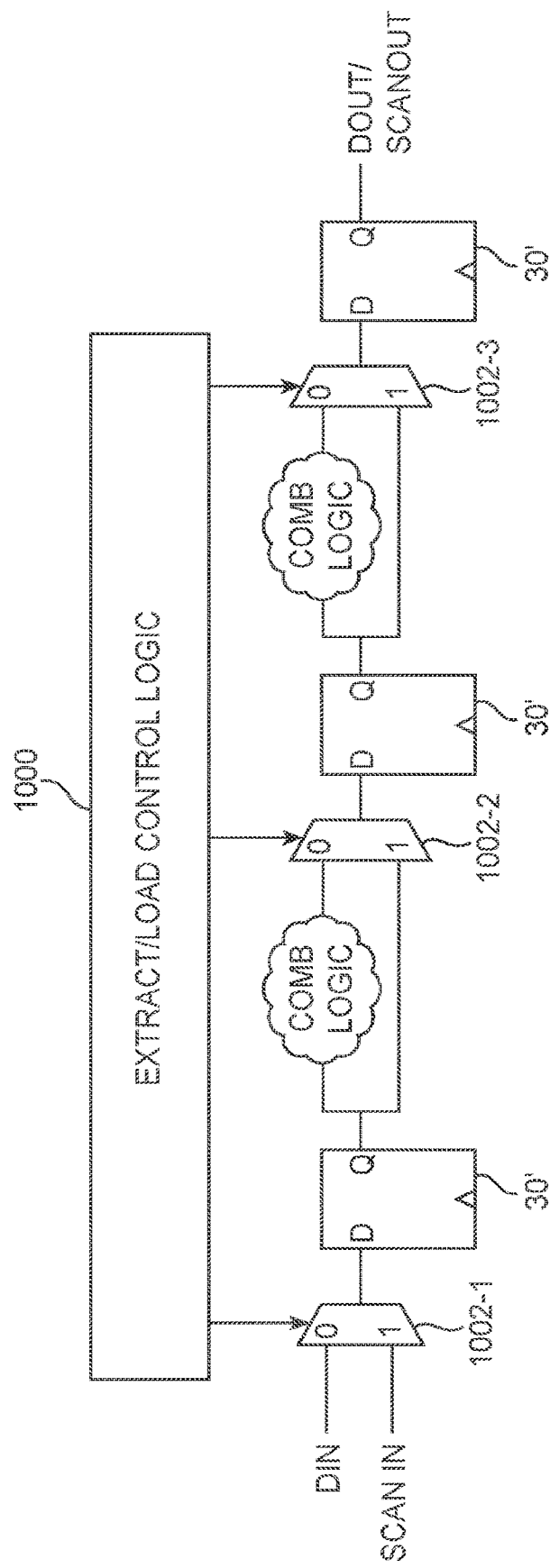
FIG. 10 is a diagram showing illustrative scan chain circuitry that can be used to extract and/or load critical register states in accordance with an embodiment.

In accordance with another suitable arrangement, scan chain circuitry may be implemented around the critical registers to extract and/or load the critical register states. FIG. 10 shows a series of registers 30' storing critical register states, where combinational logic is interposed between each successive pair of registers 30'. As shown in FIG. 10, a first multiplexing circuit such as multiplexer 1002-1 is placed at the input of the first register 30', a second multiplexing circuit such as multiplexer 1002-2 is placed at the input of the second register 30', and a third multiplexing circuit such as multiplexer 1002-3 is placed at the input of the third register 30'. Multiplexers 1002-1, 1002-2, and 1002-3 may be controlled by extraction/loading control logic 1000.

Configured in this way, the chain of registers 30' may operate normally when multiplexers 1002 receive a logic "0" control bit from logic 1000 (e.g., data input DIN and data output DOUT are active). During state extracting/loading, however, control logic 1000 may supply a logic "1" control bit to each multiplexer 1002 to configure registers 30' in a scan chain mode that effectively bypasses the combination logic circuits (e.g., scan input SCANIN and scan output SCANOUT are switched into use). In other words, control logic 1000 and multiplexers 1002 may serve collectively as the critical register state extraction/loading circuitry.

Loading state into registers 30' via this method may be destructive of the existing state. However, extracting state from registers 30' using this approach can be either destructive or non-destructive. To perform destruction extraction, a series of logic zeroes can be scanned in while the current states of registers 30' are being scanned out. The state of registers 30' after extraction will therefore be cleared to zeroes. To perform non-destructive extraction, the destructive extraction can be performed first, and then the extracted state can be loaded back in. The non-destructive approach can be more time consuming but state in registers 30' is preserved.

In general, the scan chain circuitry of FIG. 10 may be implemented using soft or hard logic on the programmable integrated circuit and can be formed around any registers 30' storing critical register states (e.g., registers that have been uniquely marked using synthesis directives) to help extract and load critical register states in an efficient manner.

Figure 11:
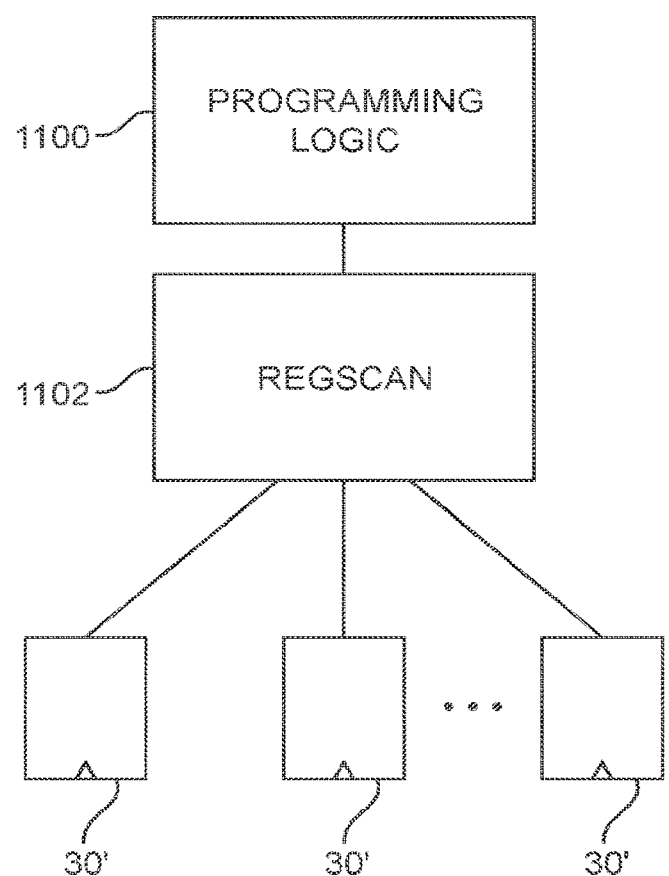
FIG. 11 is a diagram showing how existing programming logic on a programmable integrated circuit can be used to extract and/or load critical register states in accordance with an embodiment.

In yet another suitable embodiment, existing programming logic circuitry such as programming logic 1100 and register scanning logic 1102 may be implemented around the critical registers to extract and/or load the critical register states (see, e.g., FIG. 11). FIG. 11 shows registers 30' that store critical register states and that are coupled to logic circuits 1100 and 1102. Logic circuits 1100 and 1102 may be hardened (non-reconfigurable) logic blocks that already exist in programmable integrated circuit 10 of FIG. 1 and are sometimes referred to collectively as a logic sector management (LSM) module.

The LSM module is typically used to program configuration bits onto configuration memory cells in the integrated circuit. Since the LSM module is also connected to the registers on the integrated circuit, the LSM module can be operated in reverse mode to help extract only the critical register states. If desired, the LSM module can also be used to load in new register states into the critical registers during runtime (e.g., normal operation of device 10) and not just during device configuration operations. Using existing programming circuitry on device 10 to extract and/or load critical register states does not add logic to the user design, and standard drivers can be utilized to read and write critical states to and from registers 30'.

Figure 12:
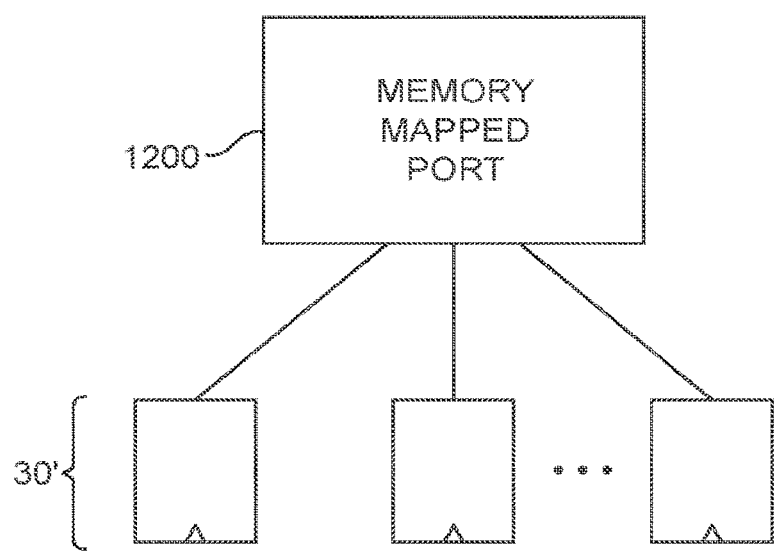
FIG. 12 is a diagram showing how a memory-mapped interface can be used to extract and/or load critical register states in accordance with an embodiment.

In yet another suitable arrangement, the synthesis tools (e.g., behavioral synthesis tools 572 or logic synthesis tools 574 of FIG. 4) may create a single memory-mapped port for reading and writing all critical register states. As shown in FIG. 12, a memory-mapped interface such as memory-mapped port 1200 that is connected to only the critical registers may be inserted into the integrated circuit design. The load and unload operations for critical register can be done by performing standard write and read operations on the memory mapped port. A simple standard memory-mapped protocol can be used so that no special software is needed to load and extract the critical register states.

If desired, any number of standard memory-mapped ports can be added to perform state extraction and loading. In general, the memory-mapped interface circuitry of FIG. 12 may be implemented using soft or hard logic on the programmable integrated circuit and can be coupled to any registers 30' storing critical register states (e.g., registers that have been uniquely marked using synthesis directives) to help extract and load critical register states in an efficient manner.

Figure 13:
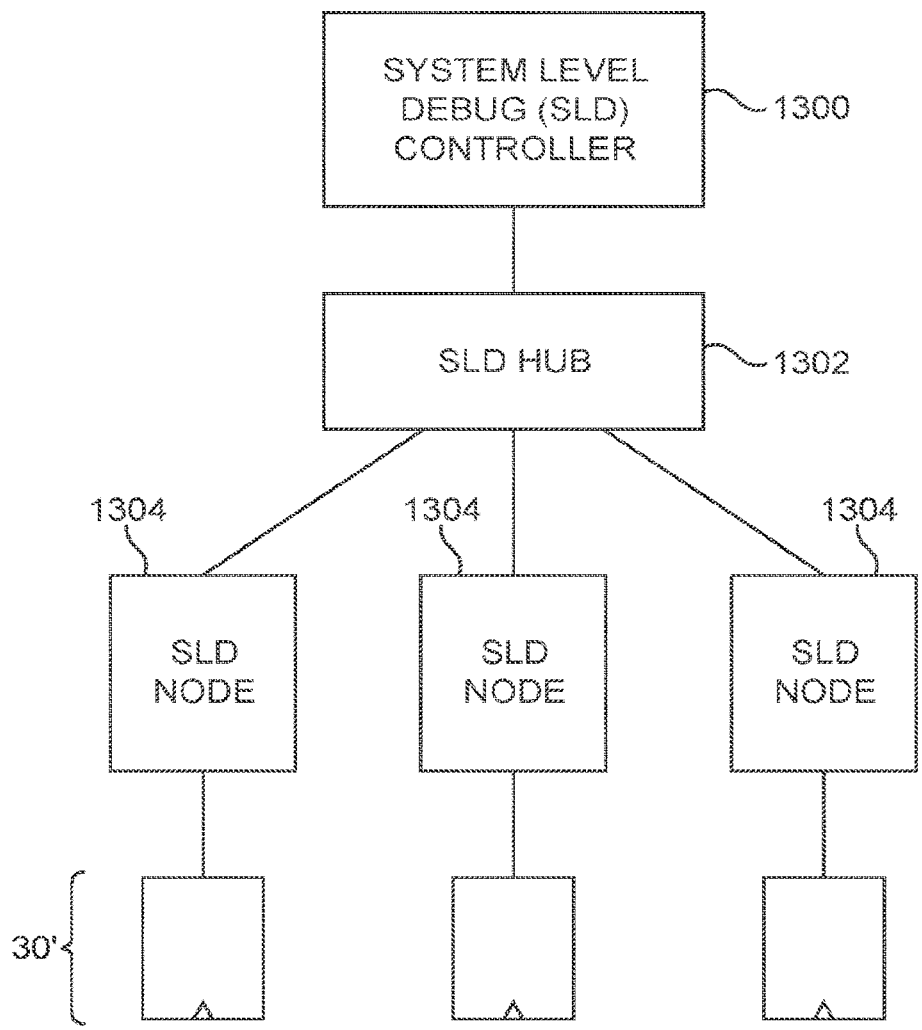
FIG. 13 is a diagram showing how existing debugging circuitry on an integrated circuit can be used to extract and/or load critical register states in accordance with an embodiment.

In accordance with another embodiment, the synthesis tools (e.g., behavioral synthesis tools 572 or logic synthesis tools 574 of FIG. 4) may connect the critical registers to debugging circuitry that already exists on programmable device 10. FIG. 13 shows existing debugging fabric that includes a system level debug (SLD) controller such as SLD controller 1300, a debugging hub such as SLD hub 1302, and SLD nodes 1304 each of which is coupled to a corresponding critical register 30'. For example, during synthesis (e.g., synthesis 604 or 606 of FIG. 5), SLD nodes 1304 may be attached to each identified critical register demarcated using synthesis directives (as an example). By exposing critical registers to the SLD fabric, the critical register states can be extractable or overwritten on demand.

SLD controller 1300 may, for example, be a Joint Test Action Group (JTAG) tap controller that uses the standard JTAG protocol to test integrated circuits. Configured in this way, the JTAG tap controller 1300 can extract critical register states on demand using standard SLD read-back transactions. By using existing debug circuitry on programmable device 10 to extract critical register states (not for conventional debugging purposes), no special software is needed to load and extract the critical register states.

Figure 14A:
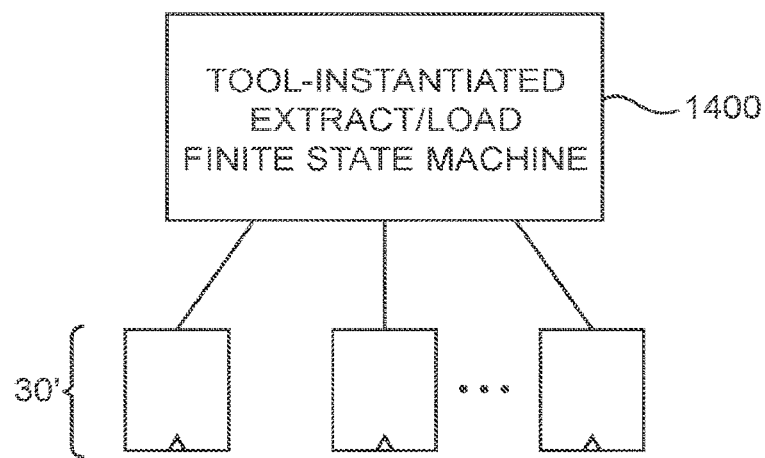
FIG. 14A is a diagram showing how a CAD-tool instantiated finite state machine can be used to extract and/or load critical register states in accordance with an embodiment.
Figure 14B:
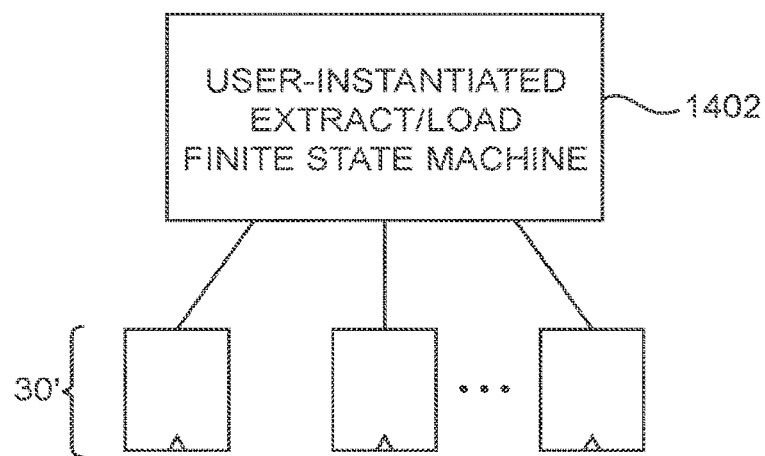
FIG. 14B is a diagram showing how a user instantiated finite state machine can be used to extract and/or load critical register states in accordance with an embodiment.

FIGS. 14A and 14B show yet other suitable arrangements for providing a low-impact paradigm for extracting and loading critical register states. FIG. 14A shows how synthesis tools (e.g., behavioral synthesis tools 572 or logic synthesis tools 574 of FIG. 4) may insert a finite state machine (FSM) such as tool-instantiated extract/load FSM 1400 that is connected to critical registers 30' via a standard interface.

Finite state machine 1400 may utilize a generic driver in the standard interface to carry out load and unload state operations for any critical registers marked using synthesis directives (as an example). Tool-instantiated FSM 1400 may be configured to automatically loop through and access all critical register states without requiring the user to input any address information. In other words, the user does not have to know which registers are storing the critical states.

FIG. 14B shows an alternate embodiment in which the synthesis tools insert a user-instantiated FSM such as user-instantiated extract/load FSM 1402. In contrast to the tool-instantiated version, the user may elect which register to expose to FSM 1402. Regardless, FSM 1402 may still load and unload critical register states via a standard interface that uses a pre-defined protocol. Finite state machine 1402 may also utilize a generic driver in the standard interface to carry out load and unload state operations for any registers selected by the user.

Figure 15:
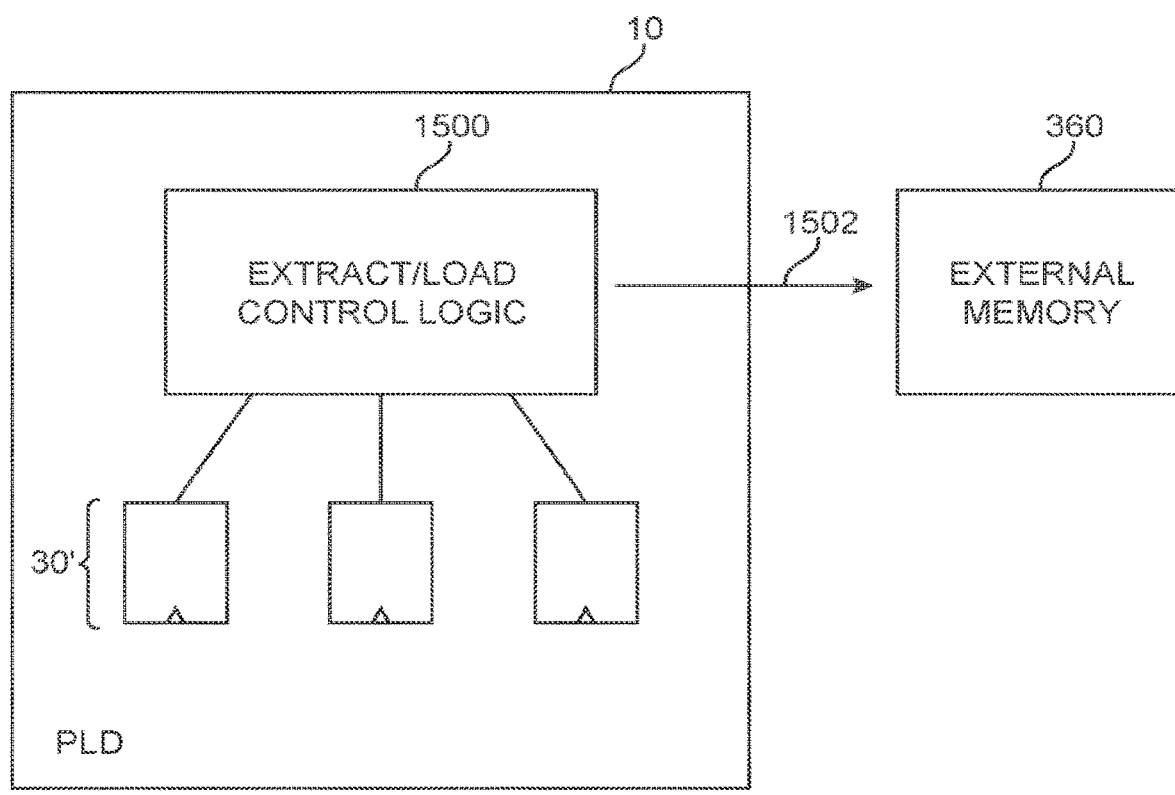
FIG. 15 is a diagram showing how critical register states can be accessed via external memory in accordance with an embodiment.

In accordance with yet another suitable arrangement, the critical register states may first be dumped into an external memory. As shown in FIG. 15, programmable device may include an extraction/loading control logic 1500 that is coupled to critical registers 30' and that is capable of retrieving the critical register states and passing them to external memory 360 via path 1502. In general, data stored in external memory 360 is fairly easy to track and/or migrate to other systems. This allows all critical register data to be migrated as a bundle. Accessing external memory 360 is also fairly straightforward by using a generic driver for triggering load and unload state operations (e.g., using a pre-defined protocol over a standard interface).

The embodiments of FIGS. 9-15 describing extraction and/or loading of critical register states are merely exemplary. These embodiments are not mutually exclusive and may be implemented individually or in any suitable combination to help improve the efficiency of live migration, debugging, and retiming (e.g., by retiming only specially demarcated registers) operations or to help improve the maximum operating frequency of integrated circuit 10 (e.g., by inserting more pipelining registers near critical registers).

The embodiments thus far have been described with respect to integrated circuits. The methods and apparatuses described herein may be incorporated into any suitable circuit. For example, they may be incorporated into numerous types of devices such as programmable logic devices, application specific standard products (ASSPs), and application specific integrated circuits (ASICs). Examples of programmable logic devices include programmable arrays logic (PALs), programmable logic arrays (PLAs), field programmable logic arrays (FPLAs), electrically programmable logic devices (EPLDs), electrically erasable programmable logic devices (EEPLDs), logic cell arrays (LCAs), complex programmable logic devices (CPLDs), and field programmable gate arrays (FPGAs), just to name a few.

The programmable logic device described in one or more embodiments herein may be part of a data processing system that includes one or more of the following components: a processor; memory; IO circuitry; and peripheral devices. The data processing can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor.

The programmable logic device may also be used as an arbiter for arbitrating access to a shared resource in the data processing system. In yet another example, the programmable logic device can be configured as an interface between a processor and one of the other components in the system.

Although the methods of operations were described in a specific order, it should be understood that other operations may be performed in between described operations, described operations may be adjusted so that they occur at slightly different times or described operations may be distributed in a system which allows occurrence of the processing operations at various intervals associated with the processing, as long as the processing of the overlay operations are performed in a desired way.

The foregoing is merely illustrative of the principles of this disclosure and various modifications can be made by those skilled in the art. The foregoing embodiments may be implemented individually or in any combination.

What is claimed is:

1. A method, comprising:
   running an application using registers stored in a first programmable logic device, wherein the registers comprise configuration registers that store a design of the first programmable logic device and user data registers used in the application; and
   migrating a function performed by the application by conveying at least some of the configuration registers and at least some of the user data registers from the first programmable logic device to a second programmable logic device.

2. The method of claim 1, wherein the first programmable logic device comprises a field-programmable gate array.

3. The method of claim 1, wherein the second programmable logic device comprises a field-programmable gate array.

4. The method of claim 1, wherein running the application comprises running the application on a first server corresponding to the registers stored in the first programmable logic device.

5. The method of claim 4, wherein migrating the function performed by the application comprises conveying the at least some registers from the first programmable logic device of the first server to the second programmable logic device.

6. The method of claim 4, wherein the first programmable logic device is on the first server and the second programmable logic device is on a second server.

7. The method of claim 6, wherein migrating the function comprises moving the application from the first server to the second server.

8. The method of claim 1, wherein migrating the function performed by the application comprises migrating at least some application code from the first programmable logic device to the second programmable logic device.

9. The method of claim 8, wherein the application comprises a design specification for the first programmable logic device or the second programmable logic device.

10. The method of claim 1, wherein the at least some of the user data registers are marked for inclusion in migration.

11. A system, comprising:
    a first programmable logic device to store registers to support execution of an application, wherein the registers comprise configuration registers that store a design of the first programmable logic device and user data registers used in execution of the application; and
    a second programmable logic device to receive at least some of the configuration registers and at least some user data registers from the first programmable logic device.

12. The system of claim 11, wherein the first programmable logic device comprises a field-programmable gate array.

13. The system of claim 11, wherein the second programmable logic device comprises a field-programmable gate array.

14. The system of claim 11, comprising a first server corresponding to the first programmable logic device.

15. The system of claim 14, comprising a second server corresponding to the second programmable logic device.

16. A method, comprising:
    storing a design of a first programmable logic device in configuration registers and user registers used in an application in user data registers;
    at least partially implementing the application using registers stored in the first programmable logic device, wherein the registers comprise the configuration registers and the user data registers; and
    transmitting at least some of the registers from the first programmable logic device to a second programmable logic device, wherein at least some of the registers comprises at least some of the configuration registers and at least some of the user data registers.

17. The method of claim 16, wherein transmitting the at least some of the registers comprises transferring a function performed using the application from the first programmable logic device to the second programmable logic device.

18. The method of claim 17, wherein transmitting the at least some of the registers comprises transferring application code from a first server associated with the first programmable logic device to a second server associated with the second programmable logic device.

* * * * *